United States Patent
Ciuc

(10) Patent No.: US 8,290,267 B2
(45) Date of Patent: *Oct. 16, 2012

(54) DETECTING REDEYE DEFECTS IN DIGITAL IMAGES

(75) Inventor: Mihai Ciuc, Bucharest (RO)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/198,624

(22) Filed: Aug. 4, 2011

(65) Prior Publication Data

US 2012/0063677 A1    Mar. 15, 2012

Related U.S. Application Data

(63) Continuation of application No. 12/824,214, filed on Jun. 27, 2010, now Pat. No. 8,000,526, which is a continuation of application No. 11/937,377, filed on Nov. 8, 2007, now Pat. No. 8,036,458.

(51) Int. Cl.
    *G06K 9/34* (2006.01)
(52) U.S. Cl. .................................................... 382/173
(58) Field of Classification Search .............. 382/173, 382/171, 167, 164; 358/1.9, 518, 523
    See application file for complete search history.

(56) References Cited

U.S. PATENT DOCUMENTS

| | | | |
|---|---|---|---|
| 5,231,674 A | 7/1993 | Cleveland et al. | |
| 5,293,430 A * | 3/1994 | Shiau et al. | 382/173 |
| 5,432,863 A * | 7/1995 | Benati et al. | 382/167 |
| 5,649,238 A | 7/1997 | Wakabayashi et al. | |
| 5,678,073 A | 10/1997 | Stephenson, III et al. | |
| 5,708,866 A | 1/1998 | Leonard | |
| 5,748,764 A * | 5/1998 | Benati et al. | 382/117 |
| 6,407,777 B1 | 6/2002 | DeLuca | |
| 6,734,911 B1 | 5/2004 | Lyons | |
| 6,873,743 B2 * | 3/2005 | Steinberg | 382/275 |
| 7,027,643 B2 * | 4/2006 | Comaniciu et al. | 382/162 |
| 7,030,927 B2 | 4/2006 | Sasaki | |
| 7,035,461 B2 * | 4/2006 | Luo et al. | 382/167 |
| 7,171,044 B2 | 1/2007 | Chen et al. | |
| 7,260,259 B2 * | 8/2007 | Comaniciu et al. | 382/173 |

(Continued)

FOREIGN PATENT DOCUMENTS

EP    1 199 672 A2    4/2002

(Continued)

OTHER PUBLICATIONS

Agrawal A. et al., Removing photography artifacts using gradient projection and flash-exposure sampling, CM Transactions on Graphics, 2005, pp. 828-835.

(Continued)

*Primary Examiner* — Samir Ahmed
(74) *Attorney, Agent, or Firm* — Andrew V. Smith

(57) ABSTRACT

A method for detecting a redeye defect in a digital image containing an eye comprises converting the digital image into an intensity image, and segmenting the intensity image into segments each having a local intensity maximum. Separately, the original digital image is thresholded to identify regions of relatively high intensity and a size falling within a predetermined range. Of these, a region is selected having substantially the highest average intensity, and those segments from the segmentation of the intensity image whose maxima are located in the selected region are identified.

21 Claims, 7 Drawing Sheets

U.S. PATENT DOCUMENTS

| | | | | |
|---|---|---|---|---|
| 7,574,069 B2* | 8/2009 | Setlur et al. | | 382/276 |
| 7,574,304 B2* | 8/2009 | Jackway et al. | | 702/19 |
| 7,593,603 B1* | 9/2009 | Wilensky | | 382/311 |
| 7,599,577 B2 | 10/2009 | Ciuc et al. | | |
| 7,630,006 B2 | 12/2009 | DeLuca et al. | | |
| 7,657,060 B2* | 2/2010 | Cohen et al. | | 382/103 |
| 7,702,149 B2* | 4/2010 | Ohkubo et al. | | 382/167 |
| 7,724,950 B2* | 5/2010 | Umeda | | 382/167 |
| 7,747,071 B2* | 6/2010 | Yen et al. | | 382/165 |
| 7,796,815 B2* | 9/2010 | Muschler et al. | | 382/173 |
| 7,804,531 B2 | 9/2010 | DeLuca et al. | | |
| 7,819,525 B2 | 10/2010 | Connell, II | | |
| 7,865,036 B2 | 1/2011 | Ciuc et al. | | |
| 8,036,458 B2 | 10/2011 | Ciuc | | |
| 2002/0089514 A1* | 7/2002 | Kitahara et al. | | 345/600 |
| 2002/0150292 A1 | 10/2002 | O'Callaghan | | |
| 2003/0012430 A1* | 1/2003 | Risson | | 382/165 |
| 2003/0113035 A1 | 6/2003 | Cahill et al. | | |
| 2003/0118217 A1 | 6/2003 | Kondo et al. | | |
| 2003/0161506 A1 | 8/2003 | Velazquez et al. | | |
| 2003/0190072 A1 | 10/2003 | Adkins et al. | | |
| 2004/0037460 A1* | 2/2004 | Luo et al. | | 382/165 |
| 2004/0041924 A1 | 3/2004 | White et al. | | |
| 2004/0057622 A1 | 3/2004 | Bradski | | |
| 2004/0114829 A1* | 6/2004 | LeFeuvre et al. | | 382/275 |
| 2004/0170304 A1 | 9/2004 | Haven et al. | | |
| 2005/0046730 A1 | 3/2005 | Li | | |
| 2005/0047655 A1* | 3/2005 | Luo et al. | | 382/167 |
| 2005/0069208 A1* | 3/2005 | Morisada | | 382/190 |
| 2005/0134719 A1 | 6/2005 | Beck | | |
| 2005/0199783 A1 | 9/2005 | Wenstrand et al. | | |
| 2005/0238230 A1* | 10/2005 | Yoshida | | 382/167 |
| 2005/0259855 A1* | 11/2005 | Dehmeshki | | 382/131 |
| 2006/0280361 A1* | 12/2006 | Umeda | | 382/167 |
| 2007/0081726 A1* | 4/2007 | Westerman et al. | | 382/185 |
| 2007/0098260 A1* | 5/2007 | Yen et al. | | 382/167 |
| 2007/0133863 A1 | 6/2007 | Sakai et al. | | |
| 2007/0154189 A1 | 7/2007 | Harradine et al. | | |
| 2007/0263928 A1 | 11/2007 | Akahori | | |
| 2011/0074985 A1 | 3/2011 | Ciuc et al. | | |

FOREIGN PATENT DOCUMENTS

| | | |
|---|---|---|
| EP | 1 528 509 A2 | 5/2005 |
| EP | 1 812 901 B1 | 6/2009 |
| GB | 2379819 A | 3/2003 |
| JP | 3205989 A2 | 9/1991 |
| JP | 7281285 A2 | 10/1995 |
| JP | 11284874 A | 10/1999 |
| JP | 2000-076427 A | 3/2000 |
| JP | 2003-030647 A2 | 1/2003 |
| JP | 2004-086891 A | 3/2004 |
| WO | 03/071484 A1 | 8/2003 |
| WO | 20071057063 A1 | 5/2007 |
| WO | WO 2009/059669 A1 | 5/2009 |
| WO | WO 2010/017953 A1 | 2/2010 |
| WO | WO 2010/025908 A1 | 3/2010 |

OTHER PUBLICATIONS

Final Office Action mailed Apr. 26, 2010, for U.S. Appl. No. 10/773,092, filed Feb. 4, 2004.
Final Office Action mailed Apr. 26, 2010, for U.S. Appl. No. 11/690,834, filed Mar. 25, 2007.
Final Office Action mailed Apr. 26, 2010, for U.S. Appl. No. 11/772,427, filed Feb. 2, 2007.
Final Office Action mailed Apr. 26, 2010, for U.S. Appl. No. 12/035,416, filed Feb. 21, 2008.
Final Office Action mailed Mar. 24, 2010, for U.S. Appl. No. 11/462,035, filed Aug. 2, 2006.
Final Office Action mailed Nov. 20, 2009, for U.S. Appl. No. 12/192,897, filed Aug. 15, 2008.
Final Office Action mailed Sep. 1, 2009, for U.S. Appl. No. 11/841,855, filed Aug. 20, 2007.
Non-Final Office Action mailed Aug. 30, 2010, for U.S. Appl. No. 11/841,855, filed Aug. 20, 2007.
Non-Final Office Action mailed Aug. 31, 2009, for U.S. Appl. No. 11/462,035, filed Aug. 2, 2006.
Non-Final Office Action mailed Aug. 5, 2010, for U.S. Appl. No. 11/462,035, filed Aug. 2, 2006.
Non-Final Office Action mailed Jul. 14, 2009, for U.S. Appl. No. 12/192,897, filed Aug. 15, 2008.
Non-Final Office Action mailed May 3, 2010, for U.S. Appl. No. 12/187,763, filed Aug. 7, 2008.
Non-Final Office Action mailed May 4, 2010, for U.S. Appl. No. 12/192,335, filed Aug. 15, 2008.
Non-Final Office Action mailed Oct. 5, 2009, for U.S. Appl. No. 10/919,226, filed Aug. 16, 2004.
Non-Final Office Action mailed Oct. 7, 2009, for U.S. Appl. No. 12/119,614, filed May 13, 2008.
Non-Final Office Action mailed Oct. 29, 2009, for U.S. Appl. No. 12/194,148, filed Aug. 19, 2008.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
Notice of Allowance mailed Feb. 1, 2010, for U.S. Appl. No. 10/919,226, filed Aug. 16, 2004.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Jun. 27, 2010, for U.S. Appl. No. 12/192,897, filed Aug. 15, 2008.
Notice of Allowance mailed Nov. 18, 2009, for U.S. Appl. No. 11/282,954, filed Nov. 18, 2005.
PCT Notification of Transmittal of the International Search Report and the Written Opinion of the International Searching Authority, or the Declaration, for PCT Application No. PCT/EP2009/005809, dated Nov. 24, 2009, 12 pages.
PCT Notification of Transmittal of the International Search Report and the Written Opinion of the International Searching Authority, or the Declaration, for PCT Application No. PCT/EP2009/006361, dated Nov. 24, 2009, 10 pages.
PCT Partial International Search Report for Application No. PCT/EP2009/051081, dated Apr. 29, 2009, 7 pages.
Tatsutoshi Kitajima (JP04-192681 English Translation; Electronic Camera, Jul. 10, 1992).
Translation of Hiroshi et al. JP05-224271, Mar. 1993, Japan Publication.
PCT International Preliminary Report on Patentability for PCT Application No. PCT/EP2008/008437, report issued May 11, 2010, 5 pages.
PCT Written Opinion of the International Searching Authority for PCT Application No. PCT/EP2008/008437, dated May 8, 2010, 4 pages.
PCT Notification of Transmittal of the International Search Report and the Written Opinion of the International Searching Authority, or the Declaration, for PCT Application No. PCT/EP2006/008342, dated Dec. 28, 2006, 11 pp.
PCT International Preliminary Report on Patentability, Chapter I of the Patent Cooperation Treaty, for PCT Application No. PCT/EP2006/008342, report issued May 20, 2008, 6 pp.
PCT Written Opinion of the International Searching Authority, (PCT Rule 43bis.1), for PCT Application No. PCT/EP20061008342, report dated May 18, 2008, 5 pages.
Smolka B.; Czubin K.; Hardeberg J.Y.; Plataniotis K.N.; Szczepanski M.; Wojciechowski K., Towards automatic redeye effect removal, Pattern Recognition Letters, North-Holland Pub. Amsterdam, Nl, vol. 24, No. 11, Jul. 2003, pp. 1767 -1785 XP004416063. ISSN: 0167-8644.
Matthew Gaubatz, Robert Ulichney, Automatic red-eye detection and correction. Proceedings 2002 International Conference on Image Processing. ICIP 2002. Rochester, NY Sep. 22-25, 2002, International Conference on Image Processing, New York, NY: IEEE, US, vol. 2 of 3, Sep. 22, 2002, pp. 804-807, XP010607446.
Jutta Willamowski, Gabriela Csurkal Probabilistic Automatic Red Eye Detection and Correction. In Proceedings of the 18th International Conference on Pattern Recognition—vol. 03 (ICPR '06), vol.

3. IEEE Computer Society, Washington, DC, USA, 762-765. DOI=10.110911CPR.2006.944 http://dx.doi.org/10.1109/ ICPR.2006.944.

Yap-Pend et al., Robust Sequential Approach for the Detection of Defective Pixels in an Image Sensor, IEEE International Conference on Acoustics, Speech, and Signal Processing, 1999, pp. 2239-2242, vol. 4., http://ieeexplorejeee.org/search/freesrchabstract.jsp?arnumber=758382andisnumber=16342andpunumber=6110andk2dockey=758382.COPYRGT.ieeecnfsandquery=%/28%/28%/2-8%28images+and+defects+and+correction%/29%/29%/29%/29+%/3Cin%3E.

Vachier et al, Valuation of image extrema using alternating filters by reconstruction, Proceedings of the SPIE—The International Society for Optical Engineering, vol. 2568, 1995, pp. 94-103.

Translation of JP11284874A; Japanese Published Patent Publication No. JP11284874A; Publication Date: Oct. 15, 1999; Application No. JP11008138.

Translation of JP2003030647A; Japanese Published Patent Publication No. JP2003030647A; Publication Date: Jan. 31, 2003; Application No. 2001-210743.

Translation of JP05-224271, PTO: 2009-5746; Japanese Published Unexamined (Kokai) Patent Publication No. 05-224271; Publication Date: Sep. 3, 1993; Application No. 04-26685.

Patent Abstracts of Japan, publication No. JP2000-076427, published on Mar. 14, 2000, for Image Processing Method.

Patent Abstracts of Japan, publication No. JP2004-086891, published on Mar. 18, 2004, for Object Detection Method in Digital Image.

* cited by examiner

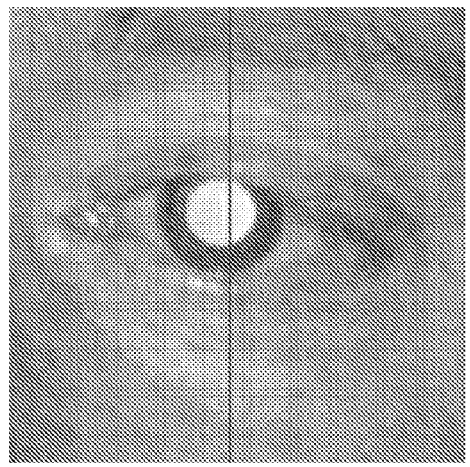 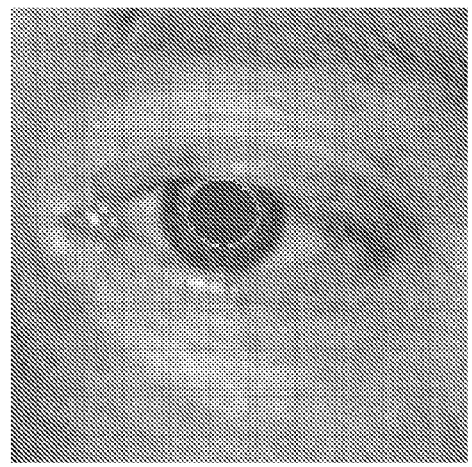
(a) (c)
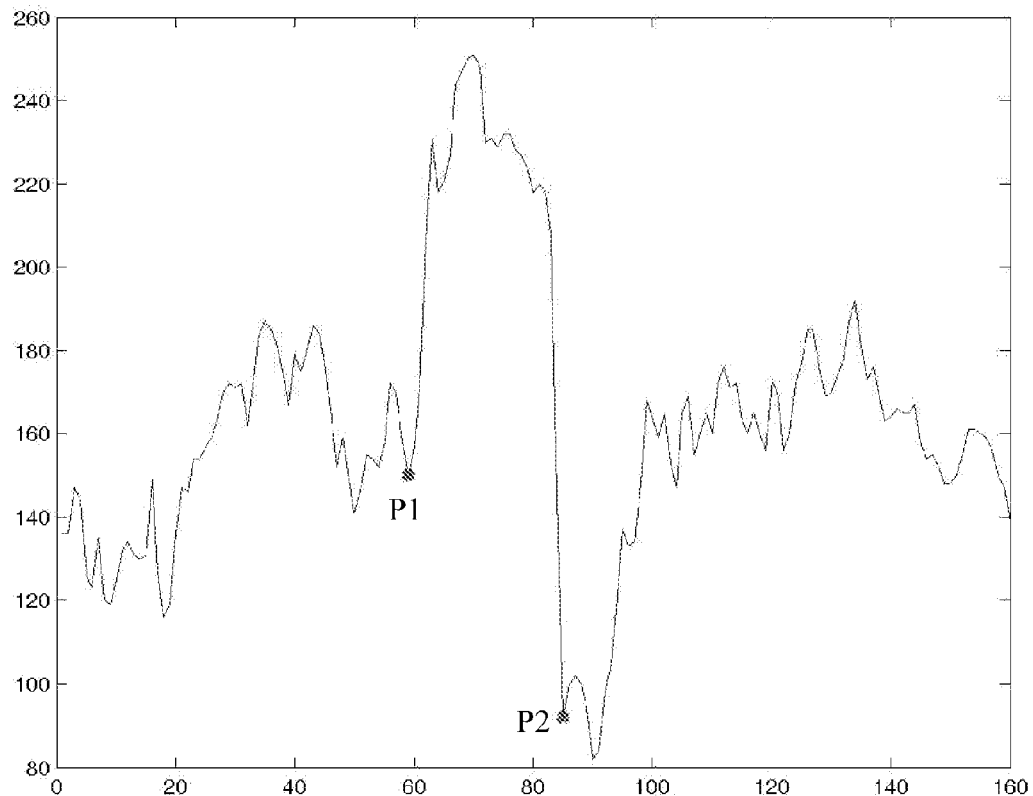
(b) Figure 3

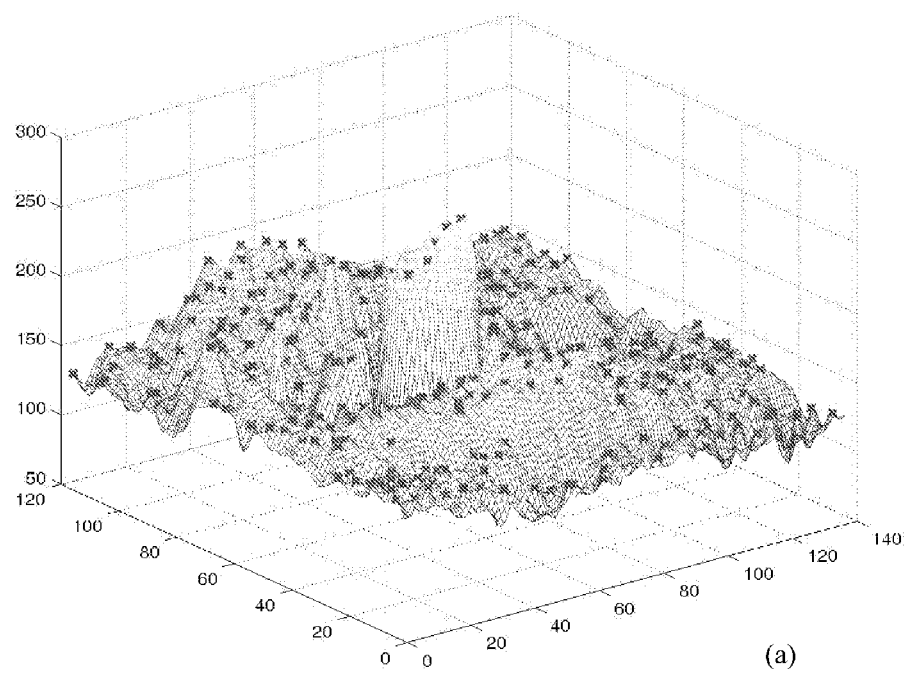
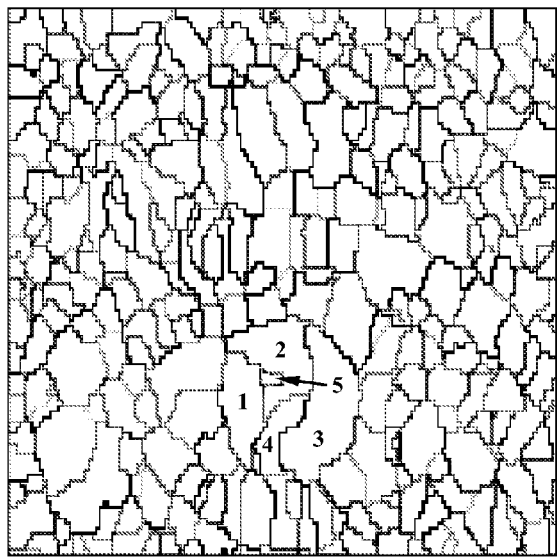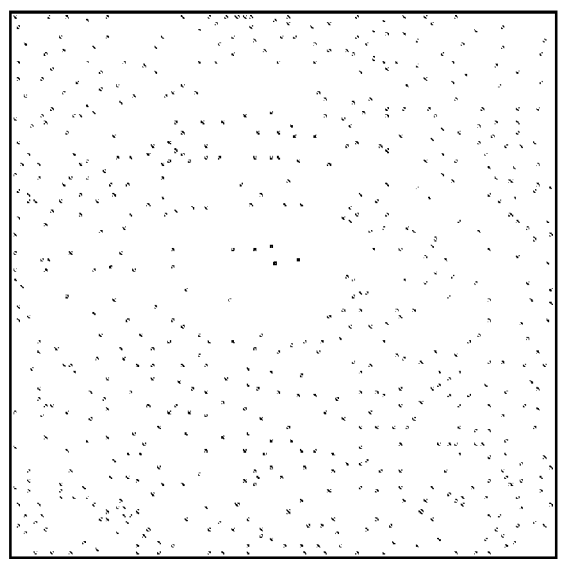
Figure 5

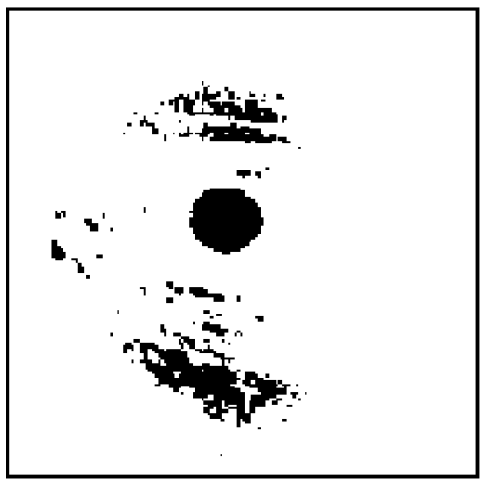
(a)
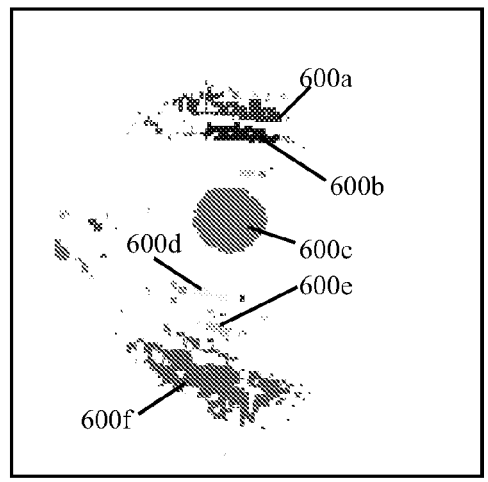
(b)
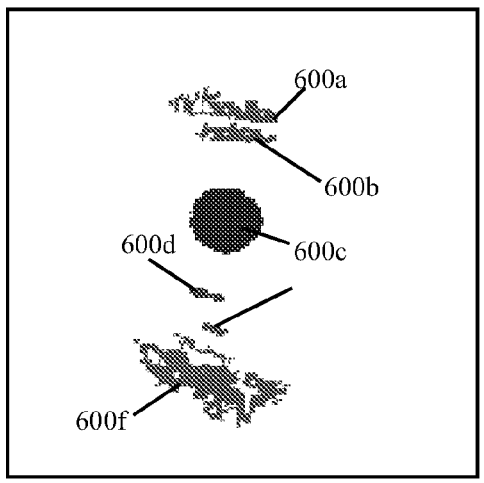
(c)
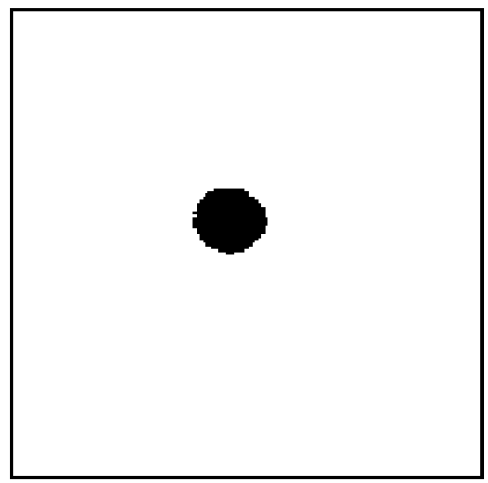
(d)
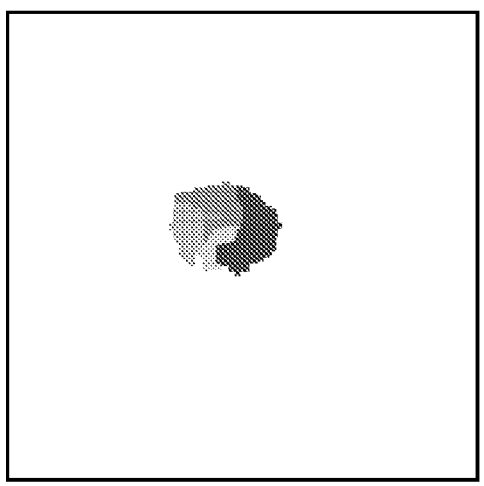
(e)
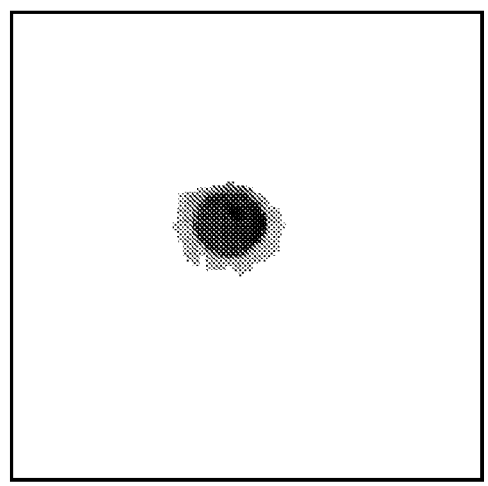
(f)
Figure 6

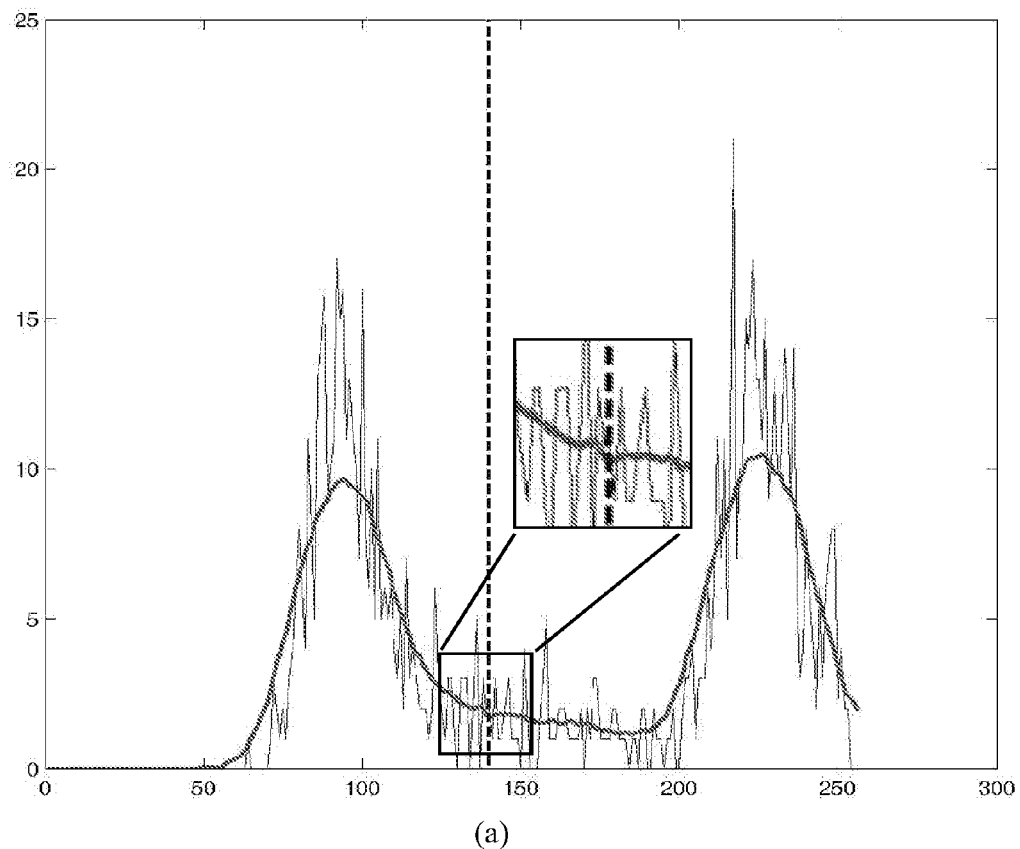
(a)
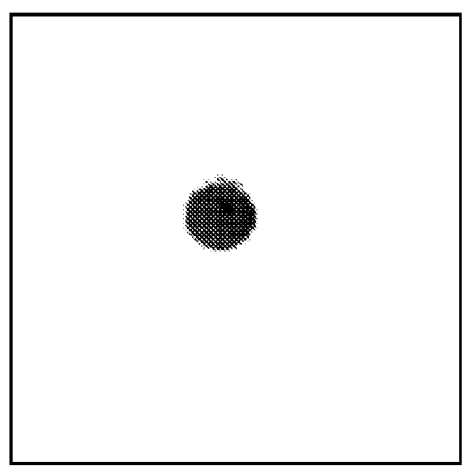
(b)
Figure 7

DETECTING REDEYE DEFECTS IN DIGITAL IMAGES

PRIORITY

This application is a Continuation of U.S. patent application Ser. No. 12/824,214, filed Jun. 27, 2010, now U.S. Pat. No. 8,000,526; which is a Continuation of U.S. patent application Ser. No. 11/937,377, filed on Nov. 8, 2007, now U.S. Pat. No. 8,036,458; and this application is related to PCT application no. PCT/EP2008/008437, filed Oct. 7, 2008, published as WO2009/059669.

FIELD

Embodiments of the invention relate generally to the field of digital image processing and more specifically to methods and apparatuses for detecting redeye defects in digital images, such "redeye" defects including any flash-induced artifact in an image of a human or animal eye, whether actually red or not.

BACKGROUND

Redeye is a phenomenon in flash photography where a flash is reflected within a subject's eye and appears in a photograph as a light, usually red, dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

The redeye phenomenon can be reduced by causing the iris to reduce the opening of the pupil. This is typically done with a "pre-flash", a flash or illumination of light shortly before a flash photograph is taken. This causes the iris to close. Unfortunately, the pre-flash is an objectionable 0.2 to 0.6 seconds prior to the flash photograph. This delay is readily discernible and easily within the reaction time of a human subject. Consequently the subject may believe the pre-flash is the actual photograph and be in a less than desirable position at the time of the actual photograph. Alternately, the subject must be informed of the pre-flash, typically losing any spontaneity of the subject captured in the photograph.

Digital photography eliminates the need for film as the image is digitally captured and stored in a memory array for display on a display screen on the camera itself. This allows photographs to be viewed and enjoyed virtually instantaneously as opposed to waiting for film processing. Digital photography equipment includes microprocessors for image processing and compression and camera systems control. It is possible to exploit the computation capabilities of such microprocessors for performing operations to improve red-eye detection and elimination.

Existing techniques for redeye detection and correction in digital images are described in U.S. Pat. No. 6,407,777 and US Patent Application Publication No. 2005/0232490. However, these prior methods are not efficient in practice.

SUMMARY

In accordance with one embodiment of the invention, a method for detecting a redeye defect in a digital image containing an eye is disclosed; the digital image is converted into an intensity image, at least a portion of the intensity image is segmented into segments each having a local intensity maximum, a corresponding portion of the digital image is thresholded to identify regions of relatively high intensity, a region from at least some of the regions of step (c) having substantially the highest average intensity is selected, and segments from step (b) intersecting the region selected at step (d) according to a pre-determined criterion are selected.

Other features and advantages of embodiments of the invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings:

FIGS. 3 to 7 show image data processed according to the method of FIG. 2 (for clarity, FIGS. 6(a) to 6(d), 6(f) and 7 are the negative or inverted form of the relevant images described in the text).

DETAILED DESCRIPTION

An image acquired with a flash may include red-eye defects. In general, these red-eye defects are detected by applying a conventional eye defect detector to the image. However images acquired with a high ISO rating, for example, greater than ISO 800, may include numerous small clusters of red-pixels indicative of noise and in such cases, the eye defect detector can identify the noise speckles as relatively small red eye defects.

Embodiments of the invention provide methods and apparatuses for detecting red eyes in high ISO flash images. For one embodiment of the invention, a digital image is acquired. One or more relatively large candidate red eye defect regions are detected in at least a portion of the image. Face detection is applied to at least a portion of the image to eliminate non-face regions and one or more relatively small candidate red eye defect regions are identified in at least a portion of the image not including the eliminated non-face regions.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable to wide range of systems in which image processing is effected.

Figure 1:
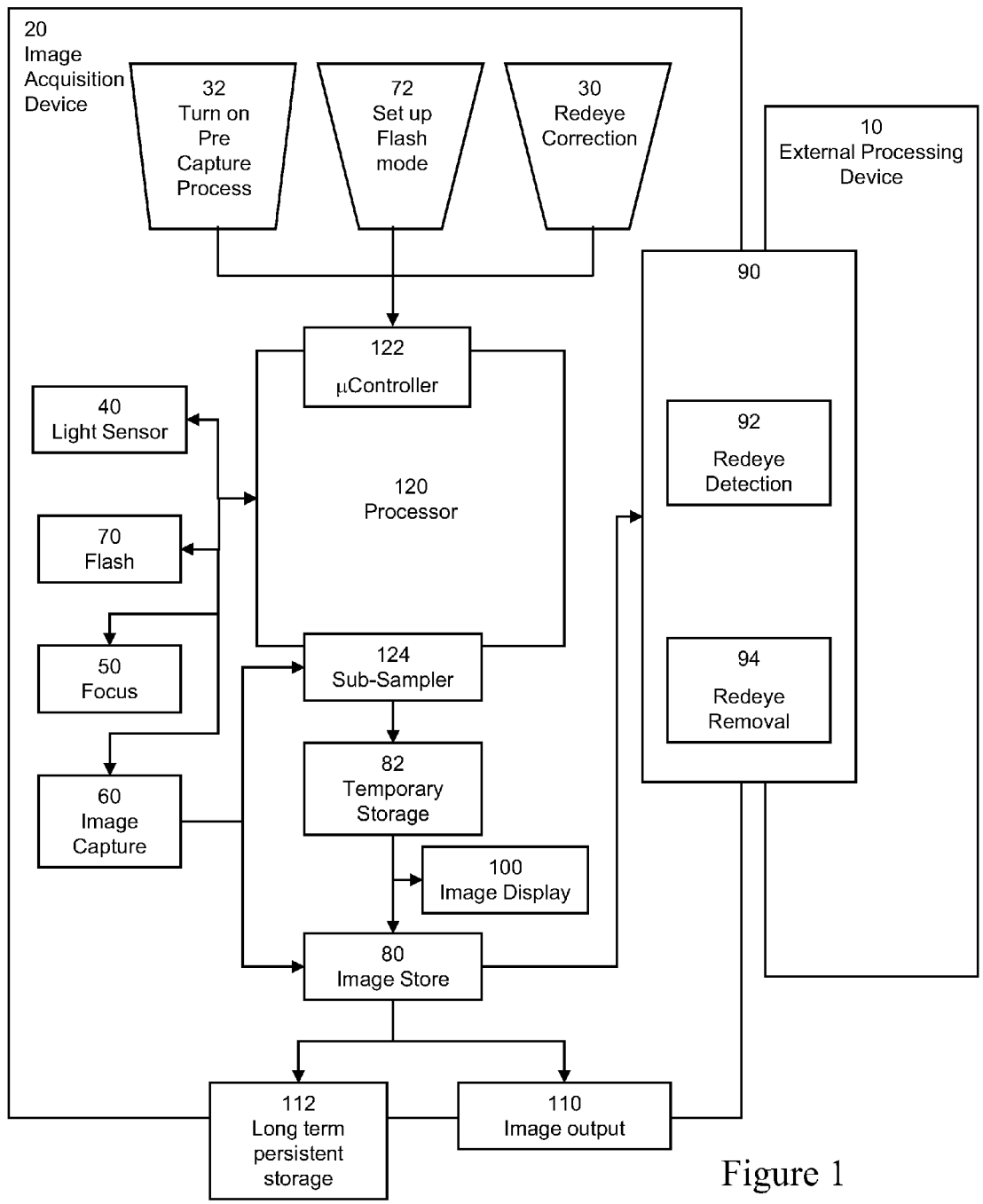
FIG. 1 is a block diagram of a digital camera operating in accordance with an embodiment of the present invention.

FIG. 1 is a block diagram of a digital image acquisition device 20 which in the present embodiment is a portable digital camera, and includes a processor 120. It can be appreciated that many of the processes implemented in the digital camera may be implemented in or controlled by software operating in a microprocessor, central processing unit, controller, digital signal processor and/or an application specific integrated circuit, collectively depicted as processor 120. Generically, all user interface and control of peripheral components such as buttons and display is controlled by a microcontroller 122. The processor 120, in response to a user input at 122, such as half pressing a shutter button (pre-capture mode 32), initiates and controls the digital photographic process. Ambient light exposure is monitored using light sensor 40 in order to automatically determine if a flash is to be used. A distance to the subject is determined using a focus component 50 which also focuses the image on image capture component 60. In the present specification, the term "image" refers to image data and does not necessarily imply that an actual viewable image is present at any stage of the processing.

If a flash is to be used, processor 120 causes the flash 70 to generate a photographic flash in substantial coincidence with the recording of the image by image capture component 60 upon full depression of the shutter button. The image capture component 60 digitally records the image in colour. The image capture component preferably includes a CCD (charge coupled device) or CMOS to facilitate digital recording. The flash may be selectively generated either in response to the light sensor 40 or a manual input 72 from the user of the camera. The high resolution image recorded by image capture component 60 is stored in an image store 80 which may comprise computer memory such a dynamic random access memory or a non-volatile memory. The camera is equipped with a display 100, such as an LCD, for preview and post-view of images.

In the case of preview images which are generated in the pre-capture mode 32 with the shutter button half-pressed, the display 100 can assist the user in composing the image, as well as being used to determine focusing and exposure. Temporary storage 82 is used to store one or more of the preview images and can be part of the image store 80 or a separate component. The preview image is preferably generated by the image capture component 60. For speed and memory efficiency reasons, preview images preferably have a lower pixel resolution than the main image taken when the shutter button is fully depressed, and are generated by sub-sampling a raw captured image using software 124 which can be part of the general processor 120 or dedicated hardware or combination thereof. Depending on the settings of this hardware subsystem, the pre-acquisition image processing may satisfy some predetermined test criteria prior to storing a preview image. Such test criteria may be chronological, such as to constantly replace the previous saved preview image with a new captured preview image every 0.5 seconds during the pre-capture mode 32, until the high resolution main image is captured by full depression of the shutter button. More sophisticated criteria may involve analysis of the preview image content, for example, testing the image for changes, before deciding whether the new preview image should replace a previously saved image. Other criteria may be based on image analysis such as the sharpness, or metadata analysis such as the exposure condition, whether a flash is going to happen, and/or the distance to the subject.

If test criteria are not met, the camera continues by capturing the next preview image without saving the current one. The process continues until the final high resolution main image is acquired and saved by fully depressing the shutter button.

Where multiple preview images can be saved, a new preview image will be placed on a chronological First In First Out (FIFO) stack, until the user takes the final picture. The reason for storing multiple preview images is that the last preview image, or any single preview image, may not be the best reference image for comparison with the final high resolution image in, for example, a red-eye correction process or, in the present embodiment, mid-shot mode processing. By storing multiple images, a better reference image can be achieved, and a closer alignment between the preview and the final captured image can be achieved in an alignment stage discussed later.

The camera is also able to capture and store in the temporary storage 82 one or more low resolution post-view images. Post-view images are low resolution images essentially the same as preview images, except that they occur after the main high resolution image is captured.

A redeye detection and correction filter 90 can be integral to the camera 20 or part of an external processing device 10 such as a desktop computer, a colour printer or a photo kiosk. In this embodiment, the filter 90 receives the captured high resolution digital image from the store 80 and analyzes it, 92, to detect redeyes. The analysis 92 is performed according to the principles of the invention as described in the embodiments to follow. If redeyes are found, the filter modifies the image, 94, to remove the redeye from the image using well-known techniques. The modified image may be either displayed on image display 100, saved on a persistent storage 112 which can be internal or a removable storage such as CF card, SD card or the like, or downloaded to another device via image output means 110 which can be tethered or wireless. The redeye filter 90 can be brought into operation either automatically each time the flash is used, or upon user demand via input 30. Although illustrated as a separate item, where the filter 90 is part of the camera it may be implemented by suitable software on the processor 120.

Figure 2:
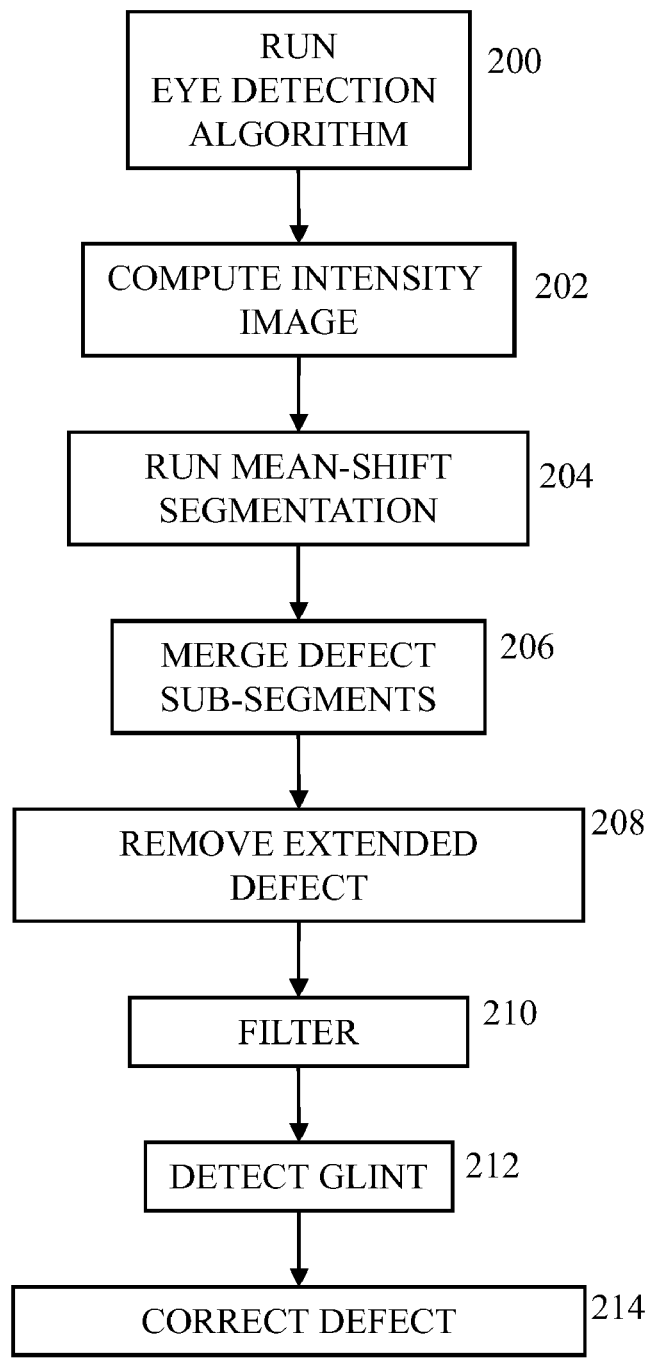
FIG. 2 is a flow diagram of the steps performed by software in the camera of FIG. 1 of an embodiment of redeye detection and correction according to the invention.

FIG. 2 is a flow diagram of the steps performed by software in the camera and/or external processing device of FIG. 1 of an embodiment of redeye detection and correction according to the invention.

1. Eye Detection

The first step 200 of the embodiment is to run an eye detection algorithm to identify regions of the image suspected to contain an eye. Examples of such algorithms are described in PCT Application No. PCT/EP2006/008342 (Ref: FN128) and U.S. Application Nos. 60/865,375 filed Nov. 10, 2006; U.S. 60/865,622 filed Nov. 13, 2006; and U.S. 60/915,669 filed May 2, 2007 (Ref: FN181/FN208) whose output is a detection rectangle which ideally should contain an eye but might be a false positive (a non-eye region). Moreover, even in the case where the detection rectangle contains an eye, in most cases it is a non-defect eye, which should not be modified by a subsequent correction algorithm. Therefore, the detection rectangle should be filtered to discard both non-eye and normal-eye regions before applying correction.

The main difficulty of the detection task is the wide variety of redeyes, both in terms of color (covering all possible hues from bright red to orange, yellow, white, and also combinations of them) and size. Moreover, in many cases, the defect is far from being uniform in terms of color and/or intensity.

Thus, the object is to find an invariant to all of the defect eyes, i.e., a property that holds true in substantially all cases. This property is that the defect is brighter than its neighborhood, and is surrounded, in general, by a darker ring.

Thus, the detection of a defect is performed solely on the intensity image (computed in this embodiment as the average of the red and green components), whereas color information is used at the later stage to make decisions upon correcting or not a defect region.

2. Detection of a Defect

The next step 202 therefore comprises computing the intensity image, FIG. 3a, of the detection rectangle issued by the eye detection algorithm at step 200.

In order to detect the defect within the intensity image, the present method exploits the fact that it is brighter that its close neighborhood. However, attempting to separate the defect by a mere thresholding of the intensity image has little chance of succeeding. This is because, firstly, the range of luminosities of possible defects is wide, therefore no prior threshold can be set to work in all cases. Also, using adaptive thresholds, i.e. determining a threshold for each case based on local intensity information, would not work well in general. This can be explained as follows: in many cases, the border between the defect and its surrounding (iris, eyelids) is not well defined all around the defect. FIG. 3a presents an example of this situation that occurs quite often—the intensity transition between the defect and the upper eyelid is not very prominent, especially in comparison with the transition between the defect and the iris. This is seen in FIG. 3b which is an intensity profile along the vertical line seen in FIG. 3a, the two points P1, P2 marking the transition intensities between the defect and upper eyelid and iris respectively. In order to spatially separate the defect by simple thresholding, a large threshold would have to be used—larger than 160, according to P1 in FIG. 3b—which would not allow inclusion in the detected region of all pixels belonging to the defect. As one can see in FIG. 3c, which is a reduced intensity image of the defect thresholded with the lowest threshold that spatially isolates the defect, there is a bright ring that is not caught in the detected region owing to using too large a threshold.

Therefore, in order to be able to separate the defect from surrounding, a more complex technique has been devised. It is based on the observation that, in most of the cases, no matter the intensity at which the defect/surrounding transition occurs, the transition is valley-shaped.

2.1 Mean-Shift Eye Segmentation.

Figure 4:
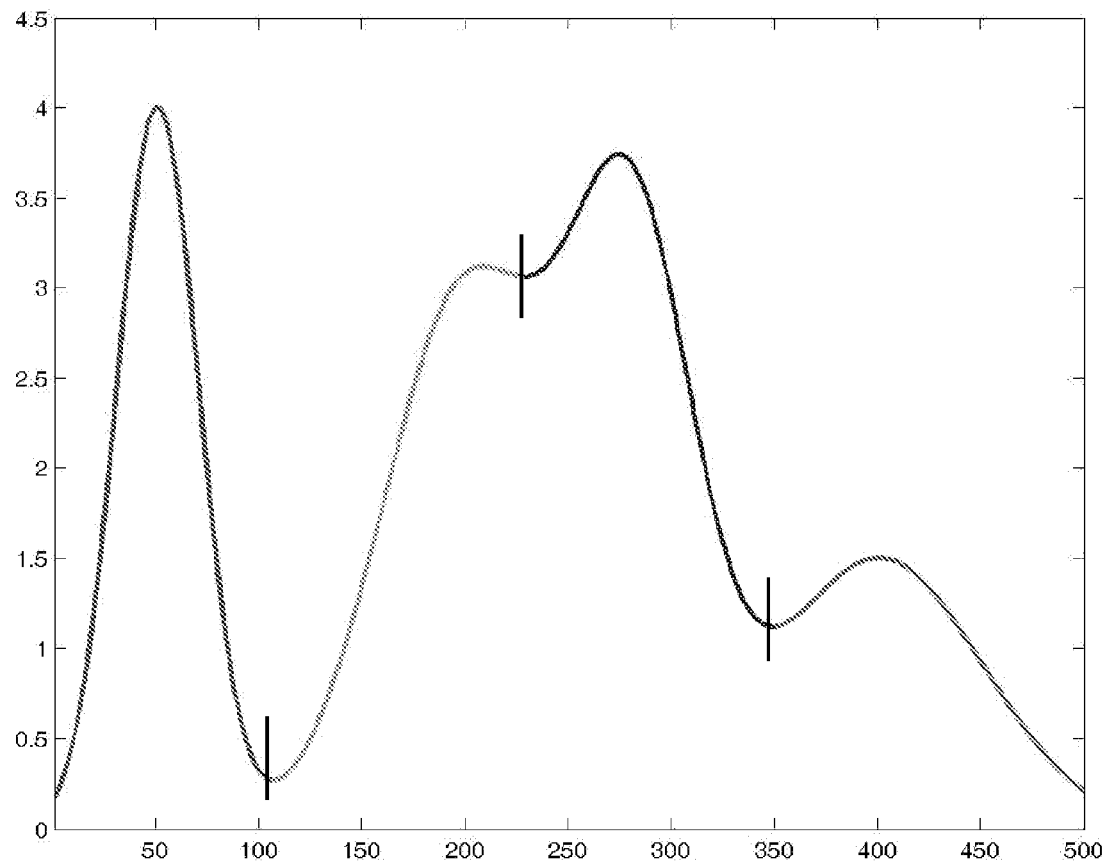

Accordingly, at step 204, the intensity image of FIG. 3a is subjected to mean-shift segmentation. The mean-shift procedure (D. Comaniciu, P. Meer: Mean Shift: A Robust Approach toward Feature Space Analysis, IEEE Trans. Pattern Analysis Machine Intell., Vol. 24, No. 5, 603-619, 2002) has been used for a number of different tasks, the most important of which is clustering (segmentation). Given an N-dimensional distribution, the basic idea of the algorithm is to identify the modes of the distribution (a mode being defined by a local maximum). As an illustration, FIG. 4 presents an example of mode identification of a 1D distribution, the short vertical lines identifying the transitions from one mode to the next. The approach is a bottom-up one, in that it starts from the points with lowest values and builds the mode evolving towards local maxima. In order to identify the modes, the following simple procedure is carried out:

For each point of the distribution, a new mode is initialized.
    Then, the neighbor with the maximum gradient is sought and added to the current mode.
    If the maximum gradient is positive, the procedure continues in the same manner starting from the newly-added neighbor.
    If the maximum gradient is negative (i.e., the current point is a local maximum) the procedure stops.
    If, during the procedure, the neighbor characterized by the maximum gradient had already been inspected (that is, it has already been assigned to a mode previously), then all points belonging to the current mode are assigned to the mode of the winning neighbor.

The procedure stops when all the points of the distribution have been assigned to a mode.

This procedure is generally applied to a distribution (a probability density function, namely, a histogram). In step 204, it is applied directly on the intensity image, considering it as a surface (equivalent to a 2D distribution). If the intensity image is too large, a local averaging with a small kernel (5.times.5 at most) may be applied prior to extracting local modes, in order to reduce small variations that may cause over-segmentation (detection of too many modes).

The results of mean-shift intensity segmentation are shown in FIG. 5, of which FIG. 5a is a pseudo 3D mesh of the intensity image with local maxima extracted by the mean shift segmentation, FIG. 5b shows the regions resulting from the segmentation, and FIG. 5c shows the local maxima of the regions in FIG. 5b viewed as an image. One may observe two things. First, as expected, the eye defect region is split into multiple segments, referred to as defect sub-segments, due to the fact that there are several local maxima inside the defect region—see FIG. 3b. In this case there are five defect sub-segments (labeled 1 to 5 in FIG. 5b) that belong to the eye defect. However, the defect is well separated from its surrounding—the eyelid is separated from the defect even though the border between the two is very weak at some pixels.

2.2 Merging the Defect Sub-Segments

Next, step 206, the defect sub-segments composing the eye defect are merged into a single segment.

The observation that enables merging all defect sub-segments into one segment is that, in general, the local maxima of these sub-segments are high and grouped together into a very high intensity region. Thus, this high-intensity region is extracted by thresholding with a very high threshold and, in one implementation, identifying all segments in the mean-shift segmented intensity that have their maxima located inside this region. Another criterion for identifying segments is whether portion of a segment area, for example more than 75%, lies inside the region.

The algorithm has the following steps:

1. Automatically compute the high threshold by the following procedure:
    a. Identify the highest-intensity pixel inside the intensity image of FIG. 3a.
    b. Take a smaller rectangle centered on that pixel. The size of the rectangle depends upon the size of the eye-detection rectangle: e.g. 10.times.10 for H<100, 20.times.20 for 100<H<200, 30.times.30 for H>200, with H being the height of the eye-detection rectangle. In the example of FIG. 3(a), the size H of the eye detection rectangle is 20.times.20.
    c. Compute the average intensity of the pixels inside the smaller rectangle.
    d. Assign the threshold to the sum of the average intensity above and a fixed quantity. The fixed quantity is determined heuristically, and the value used in the present embodiment is 25.

2. Threshold the intensity image with the above-determined threshold—the result is shown in FIG. 6a.

3. Identify all connected components of the thresholded image—FIG. 6b. This comprises linking all connected pixels in the thresholded image into respective groups 600a...*f* (the smallest groups are not labeled).

4. Eliminate connected components (i.e. the groups not labeled in FIG. 6b) whose size is inappropriate (e.g. they are smaller than 0.1% of the eye-detection rectangle area or larger than 4% of the area) or that touch the border of the detection rectangle—FIG. 6c.

5. Rank the remaining components with respect to their average intensity and retain only the top two.

6. If the difference between the average intensities of the two components is significant (e.g., the difference between them exceeds 10% of the highest average intensity), the component with the highest average intensity is selected, otherwise the component with the highest average saturation is selected—FIG. 6d.

7. Identify all the segments in the mean-shift segmented image whose maxima are located inside the selected component (or who satisfy any other criterion relative to the selected component)—FIG. 6e.

8. Merge all segments and discard all other pixels in the intensity image—FIG. 6f.

As seen in FIG. 5f, the region determined by this procedure contains not only the bright defect, but also some parts belonging to the surroundings that should not be corrected (the whole being referred to hereinafter as the "extended" defect). Therefore, these parts are removed, step 208.

2.3 Extracting the Final Defect

In order to segment the real defect from the extended defect, step 208 applies a histogram thresholding technique to the part of the intensity image corresponding to the extended defect. The mean-shift segmentation step 204 ensures that the extended defect contains no other bright parts than the defect, and this is central for determining the threshold on the histogram. The technique is the following: the intensity histogram of the part of the intensity image corresponding to the extended defect is computed. As the size of the extended defect is, in general, small, the histogram is very likely to be noisy (i.e. to contain many "spikes"—see FIG. 7a). Therefore, prior to computing the threshold, it is smoothed by convolving it with an n-pixel wide averaging kernel. The width n of the kernel is chosen heuristically and in the present embodiment n=31. Typically, after smoothing, the histogram is bimodal—see the smooth line in FIG. 7a. The first prominent maximum is determined, then the prominent minimum that follows is taken as the sought threshold, indicated by the vertical line in FIG. 7a. Note that the selected minimum is not the absolute minimum between the two modes, but it is a local minimum: it has (in this embodiment) 3 neighbours to the left and 3 to the right with higher values. Also, it is the first local minimum that follows the first maximum. All pixels in the extended defect having an intensity lower than the threshold are removed. FIG. 7b shows the result, obtained by thresholding the image in FIG. 6f with the threshold computed as above. What remains is potentially the real defect that must undergo correction. However, as previously stated, a decision on the likelihood that the detected region is a real defect must be made prior to applying correction.

3. Filtering

In the previous section, the procedure to identify the best candidate for the defect region inside the eye detection rectangle has been described. However, the detection rectangle might either be a false positive (i.e., a non-eye region wrongly detected by the eye detector) or contain a non-defect eye. In both cases, correction should not be applied. Therefore, the intensity image of FIG. 7b is filtered, step 210, to decide whether the defect region determined by the method described above is indeed an eye defect or not. The most likely defect candidate detected for a non-defect eye is the white part of the eye (sclera), as it is the brightest region in the detection rectangle. Correcting it would result in a very nasty false positive therefore it must not pass the filtering stage.

The principle behind the filter step 210 is that a real defect has the following properties:
it is round;
it is more saturated than the rest of the detection rectangle;
it is yellowier or redder (or both) than the rest of the detection rectangle;
its contour is darker than its inside.

Therefore, to decide whether an eye-defect candidate region is a real defect, or not, the following parameters are taken into account:

The region's roundness (computed as the classical circularity factor, i.e. the squared perimeter to area ratio).

The average saturation values of the region and of the detection rectangle.

The average a values of the region and of the detection rectangle (standing for average degrees of redness).

The average b values of the region and of the detection rectangle (standing for average degrees of redness). Both a and b are coordinates of the representation of colors in Lab color space.

The ratio of the average intensity of the region's contour to the average intensity of the region (this measure is the only one computed on the extended defect and not on the final defect).

Based on these measures, step 210 includes a number of filter stages to assess if the general conditions appertaining to a defect are met. The filter stages take into account that few defects meet all of the four characteristics enumerated above. Therefore, each of the conditions above might be relaxed to a certain extent at the expense of the others (i.e. imposing more strict conditions on the other characteristics). For instance, an average saturation of the candidate region slightly smaller than that of the detected rectangle is acceptable provided that the region is very round, and very yellow, etc.

4. Correction

If the defect candidate region has passed all filters and has been declared a defect, it must undergo correction, which should consist in reducing the intensity of the defect. Yet, a number of additional issues should be addressed, namely, the fact that the defect might contain a glint, and also the fact that reducing the intensity of pixels inside the defect might create unpleasant artifacts at the region's border.

4.1 Glint Detection

Accordingly, a glint detection filter is applied at step 212. In general, glint is a region that is both brighter and less saturated than the rest of the defect. Hence, the glint detection filter applies the following steps:

Detect the brightest n % points of the detected defect region.

Detect the least saturated m % points of the detected defect region. Both m and n are chosen, as a function of the size of the defect region, based on the observation that the larger the defect area, the smaller the area occupied by the glint. Also, n>m, i.e. we allow inspection of more bright pixels than least saturated pixels because, in some defects, there are parts of the defect that are brighter than the glint (e.g. for defects having between 100 and 300 pixels, m=15, n=30, etc.).

Intersect the two sets of points.

Identify the connected components of the intersection.
Choose the less saturated one as the candidate glint.
If the chosen region is round enough (roundness being assessed in terms of both aspect ratio and filling factor) it is declared glint, therefore it is removed from the region to be corrected.

4.2 Correction of the Defect

After glint detection, the region to be corrected is available. Correction then proceeds at step 214 by reducing the intensity of pixels inside the detected defect by a fixed factor, for example 5 (thus from 120 to 24, from 210 to 42, from 109 to 22, etc.). In order to reduce the artifacts at the defect border (artifacts created by the fact that pixels located on either side of the defect border are treated so much differently), after darkening the defect region, a 3.times .3 blurring is applied on the inner and outer borders of the defect. Also, another correction which is applied is redness correction in a small bounding box surrounding the defect. Its aim is to eliminate the reddish parts of the eye that do not get included in the defect region, parts that still remain visible in a number of cases unless they are processed in this manner.

The invention is not limited to the embodiment(s) described herein but can be amended or modified without departing from the scope of the present invention.

General Matters

Embodiments of the invention include apparatuses and methods for effecting red-eye defect detection. Embodiments of the invention have been described above with various specific details. It will be appreciated that such details are examples and may be modified.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for detecting a redeye defect in a digital image containing an eye, the method comprising the following steps:
    (a) converting the digital image into an intensity image, including:
        (i) subjecting the intensity image to local averaging, and
        (ii) subjecting the intensity image to mean shift segmentation, and
    (b) segmenting at least a portion of the intensity image into segments each having a local intensity maximum,
    (c) thresholding a corresponding portion of the digital image to identify regions exhibiting an intensity measure that is above a threshold value,
    (d) selecting a region from at least two regions of step (c) having the most extreme average intensity, and
    (e) identifying segments from step (b) intersecting the region selected at step (d) according to a pre-determined criterion,
    wherein the average intensities of the two regions from step (c) having the highest and next highest average intensities differ by more than a predetermined amount, and the region selected at step (d) is the region having the highest average intensity.

2. The method of claim 1, further comprising identifying regions from step (c) having a size falling within a predetermined range, and wherein said region of the most extreme average intensity is selected from said regions.

3. The method of claim 1, wherein step (e) comprises identifying those segments from step (b) whose maxima are located in the region selected at step (d).

4. The method of claim 1, wherein the subjecting the intensity image to local averaging is performed prior to the subjecting of the intensity image to mean shift segmentation.

5. The method of claim 1, further including the steps of:
    (f) computing the intensity histogram of the portion of the intensity image corresponding to the segments from step (e),
    (g) smoothing said histogram,
    (h) determining a threshold from the smoothed histogram, and
    (i) thresholding the intensity histogram with the threshold from step (h).

6. The method of claim 1 wherein steps (a) and (b) are applied to one or more portions of the image suspected to contain an eye.

7. A method for detecting a redeye defect in a digital image containing an eye, the method comprising the following steps:
    (a) converting the digital image into an intensity image, including:
        (i) subjecting the intensity image to local averaging, and
        (ii) subjecting the intensity image to mean shift segmentation, and
    (b) segmenting at least a portion of the intensity image into segments each having a local intensity maximum,
    (c) thresholding a corresponding portion of the digital image to identify regions exhibiting an intensity measure that is above a threshold value,
    (d) selecting a region from at least two regions of step (c) having the most extreme average intensity, and
    (e) identifying segments from step (b) intersecting the region selected at step (d) according to a pre-determined criterion,
    wherein step (c) uses a threshold obtained by identifying the highest intensity pixel inside the intensity image, computing the average intensity of the pixels inside a smaller rectangle centered on the highest intensity pixel, and assigning the threshold to the sum of the average intensity and a fixed quantity.

8. The method of claim 7, wherein the average intensities of the two regions from step (c) having the highest and next highest average intensities differ by more than a predetermined amount, and the region selected at step (d) is the region having the highest average intensity.

9. The method of claim 7, further comprising identifying regions from step (c) having a size falling within a predetermined range, and wherein said region of the most extreme average intensity is selected from said regions.

10. The method of claim 7, wherein step (e) comprises identifying those segments from step (b) whose maxima are located in the region selected at step (d).

11. The method of claim 7, wherein the subjecting the intensity image to local averaging is performed prior to the subjecting of the intensity image to mean shift segmentation.

12. The method of claim 7, further including the steps of:
(f) computing the intensity histogram of the portion of the intensity image corresponding to the segments from step (e),
(g) smoothing said histogram,
(h) determining a threshold from the smoothed histogram, and
(i) thresholding the intensity histogram with the threshold from step (h).

13. The method of claim 7 wherein steps (a) and (b) are applied to one or more portions of the image suspected to contain an eye.

14. A method for detecting a redeye defect in a digital image containing an eye, the method comprising the following steps:
(a) converting the digital image into an intensity image, including:
(i) subjecting the intensity image to local averaging, and
(ii) subjecting the intensity image to mean shift segmentation, and
(b) segmenting at least a portion of the intensity image into segments each having a local intensity maximum,
(c) thresholding a corresponding portion of the digital image to identify regions exhibiting an intensity measure that is above a threshold value,
(d) selecting a region from at least two regions of step (c) having the most extreme average intensity, and
(e) identifying segments from step (b) intersecting the region selected at step (d) according to a pre-determined criterion,
wherein the average intensities of the two regions from step (c) having the highest and next highest average intensities differ by less than a predetermined amount, and the region selected at step (d) is the region having the highest average saturation.

15. The method of claim 14, further comprising identifying regions from step (c) having a size falling within a predetermined range, and wherein said region of the most extreme average intensity is selected from said regions.

16. The method of claim 14, wherein step (e) comprises identifying those segments from step (b) whose maxima are located in the region selected at step (d).

17. The method of claim 14, wherein the subjecting the intensity image to local averaging is performed prior to the subjecting of the intensity image to mean shift segmentation.

18. The method of claim 14, further including the steps of:
(f) computing the intensity histogram of the portion of the intensity image corresponding to the segments from step (e),
(g) smoothing said histogram,
(h) determining a threshold from the smoothed histogram, and
(i) thresholding the intensity histogram with the threshold from step (h).

19. The method of claim 14 wherein steps (a) and (b) are applied to one or more portions of the image suspected to contain an eye.

20. A digital image acquisition and processing apparatus including a lens, an image sensor, a processor, and a memory having code embedded therein for programming the processor that performs the method as claimed in any of claims 1-6 and 13-15.

21. One or more non-transitory computer readable media having code embedded therein for programming a processor that performs the method as claimed in any of claims 1-6 and 13-15.

* * * * *